United States Patent
Zaverucha et al.

(10) Patent No.: US 9,325,642 B2
(45) Date of Patent: Apr. 26, 2016

(54) RANDOMNESS FOR ENCRYPTION OPERATIONS

(75) Inventors: Gregory Marc Zaverucha, Mississauga (CA); Daniel Richard L. Brown, Mississauga (CA)

(73) Assignee: Certicom Corp., Mississauga, ON (CA)

( * ) Notice: Subject to any disclaimer, the term of this patent is extended or adjusted under 35 U.S.C. 154(b) by 536 days.

(21) Appl. No.: 13/481,077

(22) Filed: May 25, 2012

(65) Prior Publication Data

US 2012/0300925 A1    Nov. 29, 2012

(30) Foreign Application Priority Data

May 26, 2011    (CA) .......................................... 050320

(51) Int. Cl.
H04L 9/00    (2006.01)
H04L 12/58   (2006.01)
H04L 9/14    (2006.01)
G06F 7/58    (2006.01)
H04L 9/06    (2006.01)

(52) U.S. Cl.
CPC .............. *H04L 51/00* (2013.01); *H04L 9/0662* (2013.01); *H04L 9/14* (2013.01); *G06F 7/58* (2013.01); *G06F 7/582* (2013.01); *G06F 7/588* (2013.01); *H04L 9/0656* (2013.01)

(58) Field of Classification Search
None
See application file for complete search history.

(56) References Cited

U.S. PATENT DOCUMENTS

| | | | | |
|---|---|---|---|---|
| 4,112,369 A | * | 9/1978 | Forman et al. | 380/44 |
| 4,264,781 A | * | 4/1981 | Oosterbaan et al. | 380/46 |
| 5,251,165 A | * | 10/1993 | James, III | 708/250 |
| 5,600,724 A | * | 2/1997 | Masnikosa | 380/28 |
| 5,778,069 A | | 7/1998 | Thomlinson et al. | |
| 5,886,421 A | * | 3/1999 | Mizuno et al. | 307/10.5 |
| 5,978,483 A | * | 11/1999 | Thompson, Jr. | H04L 9/12 340/5.26 |
| 6,285,761 B1 | * | 9/2001 | Patel | G06F 7/586 380/28 |
| 6,389,535 B1 | | 5/2002 | Thomlinson et al. | |
| 6,628,786 B1 | | 9/2003 | Dole | |
| 6,708,273 B1 | * | 3/2004 | Ober et al. | 713/189 |
| 7,516,169 B2 | * | 4/2009 | Collier | 708/251 |
| 7,546,327 B2 | * | 6/2009 | Zheng | 708/250 |
| 7,587,047 B2 | | 9/2009 | Crandall et al. | |

(Continued)

FOREIGN PATENT DOCUMENTS

CA    2286647    10/1998
EP    1063811    * 6/1999

OTHER PUBLICATIONS

ISO 18033-2:2006, First edition, "Information technology—Security techniques—Encryption algorithms—Part 2: Asymmetric ciphers," International Organization for Standardization, May 1, 2006, 132 pages.

(Continued)

*Primary Examiner* — Peter Poltorak
(74) *Attorney, Agent, or Firm* — Fish & Richardson P.C.

(57) ABSTRACT

Methods, systems, and computer programs for generating random values for encryption operations are described. In some examples, information from a message to be encrypted can be used to refresh the state of a pseudorandom generator. In some aspects, a state parameter of the pseudorandom generator is modified based on information in the message. Modifying the state parameter changes the state parameter from a prior state to a refreshed state based on the information in the message. A random output value is obtained by the pseudorandom generator in the refreshed state. The message is encrypted based on the random output value.

21 Claims, 2 Drawing Sheets

(56) References Cited

U.S. PATENT DOCUMENTS

| | | | |
|---|---|---|---|
| 7,925,014 B2* | 4/2011 | Kim et al. | 380/46 |
| 2002/0126841 A1* | 9/2002 | Arai | 380/46 |
| 2003/0210787 A1* | 11/2003 | Billhartz et al. | 380/270 |
| 2004/0109567 A1 | 6/2004 | Yang et al. | |
| 2004/0156498 A1* | 8/2004 | Paeng et al. | 380/30 |
| 2005/0094464 A1 | 5/2005 | Gammel et al. | |
| 2005/0157876 A1* | 7/2005 | Jeong et al. | 380/200 |
| 2006/0056625 A1* | 3/2006 | Nakabayashi et al. | 380/46 |
| 2006/0067527 A1 | 3/2006 | Urivskiy | |
| 2006/0072747 A1 | 4/2006 | Wood et al. | |
| 2006/0120521 A1* | 6/2006 | Whitehead | H04L 1/0041 380/46 |
| 2006/0224647 A1* | 10/2006 | Gutnik | 708/250 |
| 2006/0225126 A1* | 10/2006 | Brown et al. | 726/2 |
| 2008/0022122 A1 | 1/2008 | Parkinson et al. | |
| 2008/0063191 A1* | 3/2008 | Hatano | G06F 21/6209 380/45 |
| 2008/0263117 A1* | 10/2008 | Rose et al. | 708/254 |
| 2009/0054036 A1* | 2/2009 | Chen et al. | 455/411 |
| 2009/0266883 A1 | 10/2009 | Adams et al. | |
| 2010/0023749 A1 | 1/2010 | Kelly | |
| 2010/0098252 A1 | 4/2010 | Kanter et al. | |
| 2010/0121896 A1 | 5/2010 | Oram et al. | |
| 2010/0306541 A1* | 12/2010 | Chevallier-Mames | H04L 9/3236 713/170 |
| 2011/0040977 A1* | 2/2011 | Farrugia | H04L 9/0662 713/181 |
| 2011/0225223 A1* | 9/2011 | Mitra | G06F 7/58 708/254 |
| 2011/0307698 A1 | 12/2011 | Vanstone | |
| 2012/0179735 A1* | 7/2012 | Ferguson et al. | 708/254 |
| 2012/0300925 A1* | 11/2012 | Zaverucha | H04L 51/00 380/46 |
| 2013/0318139 A1* | 11/2013 | Park et al. | 708/251 |
| 2014/0006786 A1* | 1/2014 | Campagna et al. | 713/171 |

OTHER PUBLICATIONS

ISO/IEC 18031:2005, "Information technology—Security techniques—Random bit generation," International Organization for Standardization, published Feb. 1, 2009, 137 pages.

Barak, B. and S. Halvei; "A model and architecture for pseudorandom generation with applications to /dev/random"; Proceedings of the 12th ACM Conference on Computer and Communications Security (CCS'05), ACM Pres; New York; 2005; 20 pages.

Bellare, M., T. Kohno and V. Shoup; "Stateful Public Key Cryptosystems: How to Encrypt with One 160-bit Exponentiation"; Proceedings of the 13th ACM Conference on Computer and Communications Security (CCS'06), ACM Press; New York; 2006; 20 pages.

Bellare, M., Z. Brakerski, M. Naor, T. Ristenpart, G. Segev, H. Shacham and S. Yilek; "Hedged Public Key Encryption: How to Protect Against Bad Randomness"; Proceedings of ASIACRYPT '09, LNCS 5912 (2009); 18 pages.

Bellare, M., A. Desai, D. Pointcheval and P. Rogaway; "Relations among notions of security for public-key encryption schemes"; Proceedings of CRYPTO'98, LNCS 1462 (1998); 32 pages.

Brown, D.R.L. and K. Gjøsteen; "A Security Analysis of the NIST SP 800-90 Elliptic Curve Random Number Generator"; Proceedings of CRYPTO'07, LNCS 4622 (2007); 15 pages.

Barker, E. and J. Kelsey; "Special Publication 800-90: Recommendation for Random Number Generation Using Deterministic Bit Generators (Revised)", National Institute of Standards and Technology; Mar. 2007, 133 pages.

Ristenpart, T. and S. Yilek; "When Good Randomness Goes Bad: Virtual Machine Reset Vulnerabilities and Hedging Deployed Cryptography", Proceedings of Network and Distributed Security Symposium NDSS'10 (2010), 18 pages.

G. Yang, S. Duan, D.S. Wong, C.H. Tan and H. Wang. "Authenticated Key Exchange under Bad Randomness." Version from the author G. Yang on or about Feb. 16, 2011; to appear in Financial Cryptography and Data Security 2011 —FC'11; 15 pages.

S. Yilek. Resettable Public Key Encryption: How to Encrypt on a Virtual Machine. Proceedings of CT-RSA'10, LNCS 5985 (2010), 12 pages.

Optimal asymmetric encryption padding—Wikipedia. Accessed online at: http://en.wikipedia.org/wiki/Optimal_asymmetric_encryption_padding, last edited Mar. 4, 2011, 2 pages.

Draft ANS X9.82: Part 4-2011. Random Number Generation—Part 4: Random Bit Generator Constructions, American National Standard for Financial Services, Jan. 2011, 136 pages.

A. Menezes, P. van Oorschot, and S. Vanstone, Pseudorandom Bits and Sequences, Handbook of Applied Cryptography—Chapter 5, CRC Press, 1996, 23 pages.

A. Menezes, P. van Oorschot, and S. Vanstone, Public Key Encryption, Handbook of Applied Cryptography—Chapter 8, CRC Press, 1996, 38 pages.

Standards for Efficient Cryptography 1 (SEC 1), Version 2.0, Standards for Efficient Cryptography Group (SECG), May 2009, 144 pages.

IEEE 1363-2000, IEEE Standard Specifications for Public-Key Cryptography, IEEE Standards Association, 2000, 236 pages.

Eastlake et al.; "Randomness Requirements for Security," Network Working Group; RFC 4086; Jun. 2005; 45 pages.

Garfinkel et al.; "Practical UNIX and Internet Security"; Chapters 23.8-23.9 Picking a Random Seed; Apr. 8, 1996, 7 pages.

Mihir Bellare, Alexandra Boldyreva, and Adam O'Neill, "Deterministic and Efficiently Searchable Encryption," Advances in Cryptology—CRYPTO '07 Proceedings. Lecture Notes in Computer Science, vol. 4622, pp. 535-552, A. Menezes ed., Springer, 2007, 43 pages.

Mihir Bellare, et al., "Deterministic Encryption: Definitional Equivalences and Constructions without Random Oracles," Advances in Cryptology—CRYPTO '08, Lecture Notes in Computer Science, D. Wagner ed., Springer-Verlag, 2008, 33 pages.

Alexandra Boldyreva, Serge Fehr, Adam O'Neill, "On Notions of Security for Deterministic Encryption, and Efficient Constructions without Random Oracles," Advances in Cryptology—CRYPTO 2008, 28th Annual International Cryptology Conference, D. Wagner ed., LNCS, Springer, 2008, 32 pages.

Celine Chevalier, "Optimal Randomness Extraction from a Diffie-Hellman Element," Advances in Cryptology—Proceedings of Eurocrypt '09, (2009), pp. 572-589.

Jean Campbell, Randall J. Easter, "Annex C: Approved Random Number Generators for FIPS PUB 140-2, Security Requirements for Cryptographic Modules," Draft, Nov. 2010, 6 pages.

Shoichi Hirose, "Security Analysis of DRBG Using HMAC in NIST SP 800-90," Lecture Notes in Computer Science, 2009, vol. 5379/2009, 15 pages.

Seny Kamara and Jonathan Katz, "How to Encrypt with a Malicious Random Number Generator," Lecture Notes in Computer Science, vol. 5086, 13 pages.

Hugo Krawczyk, "Cryptographic Extraction and Key Derivation: The HKDF Scheme," Crypto 2010, LNCS 6223, 34 pages.

International Search Report and Written Opinion of International Searching Authority issued in International Application No. PCT/CA2011/050320 on Feb. 8, 2012; 8 pages.

International Preliminary Report on Patentability under Chapter I issued in International Application No. PCT/CA2011/050320 on Dec. 5, 2013; 6 pages.

Extended European Search Report in European Application No. 11866239.4, dated Jul. 9, 2015, 6 pages.

* cited by examiner

RANDOMNESS FOR ENCRYPTION OPERATIONS

CROSS-REFERENCE TO RELATED APPLICATIONS

This application claims the benefit of PCT Application Serial No. PCT/CA2011/050320, entitled "Randomness for Encryption Operations," filed on May 26, 2011, the entire contents of which is hereby incorporated by reference.

BACKGROUND

This specification relates to generating random values for encryption operations in a cryptography system. Cryptography systems enable secure communication over public channels. For example, in public-key systems, a message sender encrypts a plaintext message using an encryption algorithm, and transmits the encrypted message to a recipient. The recipient can use a secret key value to recover the plaintext message from the encrypted message. In some cryptography systems, the encryption algorithm uses random values to circumvent certain types of attacks.

BRIEF DESCRIPTION OF THE DRAWINGS

Like reference numbers and designations in the various drawings indicate like elements.

DETAILED DESCRIPTION

Figure 1:
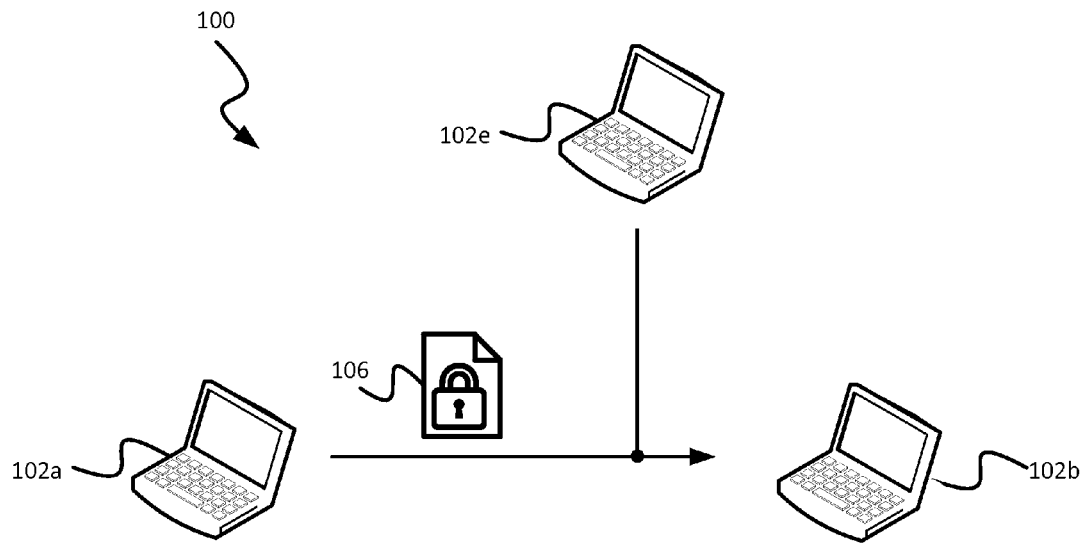
FIG. 1 is a schematic diagram showing aspects of an example cryptography system.

A cryptography system can encrypt messages by an encryption algorithm. Many encryption algorithms utilize randomness. For example, an encryption algorithm can use values that are random, from an adversary's perspective, to protect against certain types of attacks by the adversary. Operations that are randomized in the encryption algorithm can increase cryptographic security in some cases. In some example algorithms, randomness can be used to increase the effective size of a plaintext message space, to creating a one-to-many mapping of plaintext to ciphertext, to level the distribution of encryption inputs, or in a combination of these and other ways to decrease the effectiveness or efficiency of sophisticated adversarial attacks.

Entropy can be used to quantify the disorder, randomness or variability in a closed system. The entropy of information can be quantified, for example, in bits. The entropy of a message can indicate the amount of information that would be provided by an observation of the message. As such, entropy of information can be relative to an observer and the observer's knowledge without direct observation of the information. The entropy of randomness used in an encryption algorithm can indicate, from an adversary's perspective, the average information content unknown to the adversary.

A pseudorandom generator can provide entropy for an encryption algorithm. A pseudorandom generator can be implemented in hardware, software, firmware, or any combination thereof. A pseudorandom generator can operate deterministically and provide an output that appears random from an adversary's perspective. Accordingly, the output of a pseudorandom generator can be referred to as a random output value although the pseudorandom generator itself operates deterministically. In some implementations, the random output value obtained from a pseudorandom generator depends on the state of the pseudorandom generator. For example, the pseudorandom generator may define multiple different states that each correspond to a different random output value. The state can be updated, for example, by progressing to a subsequent state each time the pseudorandom generator provides a random output value. The state can be refreshed, for example, to add entropy to the state periodically or upon specified conditions.

In some cases, a pseudorandom generator can pass polynomial-time statistical tests. For example, in some cases an output sequence from a pseudorandom generator cannot be distinguished from a truly random sequence of the same length by a polynomial-time algorithm with probability greater than one half. A pseudorandom generator can include one or more pseudorandom bit generators. In some cases, a pseudorandom bit generator can pass a next-bit test. For example, in some cases, given the first n output bits from a pseudorandom bit generator, no polynomial-time algorithm can predict the (n+1) output bit with a probability significantly greater than one half.

In some scenarios, to circumvent certain types of attacks by an adversary, the randomness used by an encryption system should have a certain level of entropy from the adversary's perspective. Operating under ideal conditions, a pseudorandom generator may provide the specified level of entropy. However, various types of circumstances have the potential to degrade the quality of randomness used by the encryption system. To ensure that the pseudorandom generator maintains the specified level of entropy despite the possibility of certain types of faults or attacks, or having been initialized with insufficient entropy, additional entropy can be added to the entropy of the pseudorandom generator.

In some implementations, an encryption system can hedge against imperfect randomness by harvesting entropy from the message to be encrypted. For example, a message to be encrypted by an encryption system has some entropy from the adversary's perspective, and this entropy can be harvested and added to the entropy of the pseudorandom generator's state. In some implementations, the pseudorandom generator is refreshed based on a refresh value constructed from some or all of the message to be encrypted. Additionally or alternatively, entropy can be harvested from the message in another manner to hedge against imperfect randomness.

In some cases, perfect randomness can provide output values according to a uniform distribution on the set of all possible random values, and imperfect randomness can provide output values according to a non-uniform distribution. In an encryption scheme, imperfect randomness may not have the level of entropy specified by the encryption scheme. Imperfect randomness can be the result of an imperfect random number generator or other types of circumstances. A random number generator may be imperfect due to poor seeding, due to poor implementation, due to side-channel attacks that can leak information about the state of the generator, or due to other circumstances. An encryption scheme that hedges against imperfect randomness can provide increased security. By hedging against imperfect randomness, public-key encryption can achieve a desired level of security even when the ciphertext is generated based on imperfect randomness, for example, when adversaries have some partial information about the randomness used during encryption.

FIG. 1 is a schematic diagram of an example cryptography system 100. The cryptography system 100 includes a sender terminal 102a, a recipient terminal 102b, and an adversary terminal 102e ("terminals 102"). The cryptography system 100 can include additional, fewer, or different components. For example, the cryptography system 100 may include storage devices, servers, additional terminals, and other features not shown in the figure.

The terminals 102a, 102b can communicate with each other, and the adversary terminal 102e can observe communication between terminals 102a, 102b. In some implementations, some or all of the components of the cryptography system 100 communicate with each other over one or more data networks or other types of communication links. For example, the terminals 102a, 102b may communicate with each other over a public data network, and the adversary terminal 102e may observe the communication by accessing the public data network. In some implementations, the terminals 102a, 102b can communicate over a private network or another type of secure communication link, and the adversary terminal 102e may gain access to some or all of the transmitted data.

The communication links utilized by cryptography system 100 can include any type of data communication network or other types of communication links. For example, the cryptography system 100 can utilize wired communication links, wireless communication links, and combinations thereof. As another example, the cryptography system 100 can utilize a wireless or wired network, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. In some instances, the cryptography system 100 can utilize a tiered network structure defined by firewalls or similar features that implement various levels of security.

In the example shown in FIG. 1, the sender terminal 102a can send data to the recipient terminal 102b, and the terminals 102a, 102b have agreed upon an encryption scheme and parameters for implementing the encryption scheme. For example, the encryption scheme can include a public key encryption scheme, a symmetric key encryption scheme, or another type of scheme. The sender terminal 102a can use the encryption scheme to encrypt the data to be sent to the recipient terminal 102b. The encrypted data can be included in the message 106 that the sender terminal 102a sends to the recipient terminal 102b. The recipient terminal 102b can receive the message 106 and use a decryption algorithm of the encryption scheme to recover the original (unencrypted) data. The cryptography system 100 can support additional or different types of communication. In some implementations, the encryption scheme utilizes digital certificates administered by a certificate authority. In some implementations, the terminals 102 exchange digitally signed messages, plaintext messages, and other types of information.

The adversary terminal 102e has information on the encryption scheme and possibly some of the parameters of the encryption scheme used by the sender terminal 102a and the recipient terminal 102b. The sender terminal 102a can implement secure communications, even in the presence of sophisticated attacks by the adversary terminal 102e. For example, in some instances the encryption scheme implemented by the sender terminal 102a prevents a successful replay attack, chosen ciphertext attack, or other type of attack by the adversary terminal 102e.

In some implementations, the cryptography system 100 circumvents adaptive attacks by the adversary terminal 102e even when the adversary terminal 102e can see the public key of the recipient terminal 102b. In some examples, partial information about the plaintext and the pseudorandom generator state known to the adversary terminal 102e can be modeled by allowing the adversary terminal 102e to specify the distributions that these values are chosen from. The security of the encryption scheme may vary in some cases based on the joint distribution of the initial state and the plaintext. In some instances, a secure encryption scheme can be implemented by the sender terminal 102a and the recipient terminal 102b in the presence of such an attack.

In an example case, the sender terminal 102a is encrypting a message m to be sent to the recipient terminal 102b, and the adversary terminal 102e is an eavesdropper. In this example case, the sender terminal 102a uses a public key encryption scheme that generates a ciphertext message c from the plaintext message m by an encryption algorithm. The randomness used by the encryption algorithm is generated at the sender terminal 102a by a stateful pseudorandom generator. Although the adversary terminal 102e does not have access to the plaintext message m to be encrypted, the adversary terminal 102e has access to plaintext messages that correspond, according to the encryption scheme implemented by the sender terminal 102a, to some (possibly chosen) ciphertext messages. The adversary terminal 102e also has access to the public key value of the recipient terminal 102b.

Continuing the example case, k bits of entropy are required for the specified level of security, and the seed of the pseudorandom generator has fewer than k bits of entropy from the perspective of the adversary terminal 102e. The plaintext message m to be encrypted has some additional entropy from the perspective of the adversary terminal 102e. Before generating the random value for the encryption algorithm and before applying the encryption algorithm to the message m, some or all of the additional entropy can be harvested from the plaintext message m using the refresh functionality of the pseudorandom generator. For example, some standardized pseudorandom generators provide refresh functionality (sometimes referred to as "reseed" functionality), and the sender terminal 102a can use this functionality to add entropy to the state of the pseudorandom generator from the plaintext message m. The sender terminal 102a then obtains a random output value r by the pseudorandom generator based on the refreshed state of the pseudorandom generator. The sender terminal 102a then creates the ciphertext message c by the encryption algorithm based on the random output value r and the plaintext message m.

In some implementations, refreshing the state of the pseudorandom generator based on information in the message to be encrypted provides added protection against poorly seeded or state leakage of the pseudorandom generator. Moreover, such techniques may provide the benefit that the public key encryption scheme does not need to be re-implemented and re-standardized to hedge against reduced entropy in the pseudorandom generator. As such, in some cases, the techniques described herein can be implemented using standardized pseudorandom generators and in a manner that complies with standardized public key encryption schemes. In some implementations, such standardized public key encryption schemes can be used with little or no loss of efficiency, as the cost of the refresh operation for some pseudorandom generators can be comparable to the cost of generating a random output.

The components of the cryptography system 100 can be implemented by any suitable computing systems or sub-systems. For example, the terminals 102 can each be implemented using any suitable user device, server system, device or system components, or combinations of these and other types of computing systems. A computing system generally includes a data processing apparatus, a data storage medium, a data interface, and possibly other components. The data storage medium can include, for example, a random access memory (RAM), a storage device (e.g., a writable read-only memory (ROM), etc.), a hard disk, or another type of storage medium. A computing system can be preprogrammed or it can be programmed (and reprogrammed) by loading a program from another source (e.g., from a CD-ROM, from another computer device through a data network, or in another manner). A computing system may include an input/output controller coupled to input/output devices (e.g., a monitor, a keyboard, etc.) and to a communication link. In some implementations, the input/output devices can receive and transmit data in analog or digital form over communication links such as a serial link, wireless link (e.g., infrared, radio frequency, etc.), parallel link, or another type of link.

In some examples, the terminals 102 can be implemented as computing devices that can communicate based on a cryptographic scheme. The terminals 102 are generally operable to receive, transmit, process, and store information. Although FIG. 1 shows three terminals 102, a cryptography system 100 may include any number of terminals. The cryptography system 100 can include groups or subgroups of terminals that can communicate with each other, but not necessarily with the terminals in other groups or subgroups. The cryptography system 100 can include terminals of disparate types, having different types of hardware and software configurations, and in a variety of different locations. For example, the sender terminal 102a, the recipient terminal 102b, and the adversary terminal 102e can all be implemented as different types of systems or devices. In some cases, multiple devices or subsystems can be identified together as a single terminal.

The terminals 102 typically include a data processing apparatus, a data storage medium, and a data interface. For example, the terminals 102 can include a memory, a data processor, and an input/output controller. A terminal can include user interface devices, for example, a monitor, touch-screen, mouse, or keyboard. The memory of the terminal can store messages and information associated with the cryptography system. For example, a terminal may store key data, digital certificate data, and other types of information. The memory of the terminal can store instructions (e.g., computer code) associated with computer applications, programs and computer program modules, and other resources.

The terminals 102 can be implemented as handheld devices such as smart phones, personal digital assistants (PDAs), portable media players, laptops, notebooks, tablets, and others. Terminals can include work stations, mainframes, non-portable computing systems, devices installed in structures, vehicles, and other types of installations. Terminals can include embedded communication devices. For example, the terminals can include messaging devices that are embedded in smart energy meters of a smart energy system. Other types of terminals may also be used.

A terminal can be associated with a particular user entity, a particular user identity, or any combination thereof. One or more of the terminals can be associated with a human user. In some implementations, the terminals are not associated with any particular human user. One or more of the terminals can be associated with a particular device, a particular location, a particular installation, or other identifying information.

In some aspects of operation, the sender terminal 102a has a message to send to the recipient terminal 102b. The content of the message is not initially known to either the recipient terminal 102b or the adversary terminal 102e. The sender terminal 102a uses the information in the message to modify the state of a pseudorandom generator at the sender terminal 102a. For example, the state of the pseudorandom generator can be refreshed based on information in the message. In some cases, the information can be extracted from the message and used as a refresh value for refreshing the state of the pseudorandom generator. The sender terminal 102a obtains a random output value from the pseudorandom generator based on the refreshed state. The sender terminal 102a uses an encryption algorithm to encrypt the message based on the random output value, and the sender terminal 102a sends the message 106 to the recipient terminal 102b. The recipient terminal 102b has access to a secret value (e.g., a private key) that can be used to efficiently or conveniently decrypt the message.

In some cases, the adversary terminal 102e observes the encrypted message 106, but the adversary terminal 102e does not have access to the secret value that can be used to efficiently or conveniently decrypt the message. As such, the adversary terminal 102e may launch an attack to compromise the security of the encryption scheme used by the sender terminal 102a and the recipient terminal 102b. Some types of attacks have a greater chance of success when the entropy of the random value used by the encryption operation is low. For example, if the adversary terminal 102e has access to the initial state of the pseudorandom generator used by the sender terminal 102a, the encryption scheme may be vulnerable to certain types of attacks by the adversary terminal 102e. From the perspective of the adversary terminal 102e, refreshing the state of the pseudorandom generator based on information in the message prior to obtaining the random output value from the pseudorandom generator increases the entropy of the random output value. As such, certain types of attack launched by the adversary terminal 102e in FIG. 1 have a lower chance of success.

Figure 2:
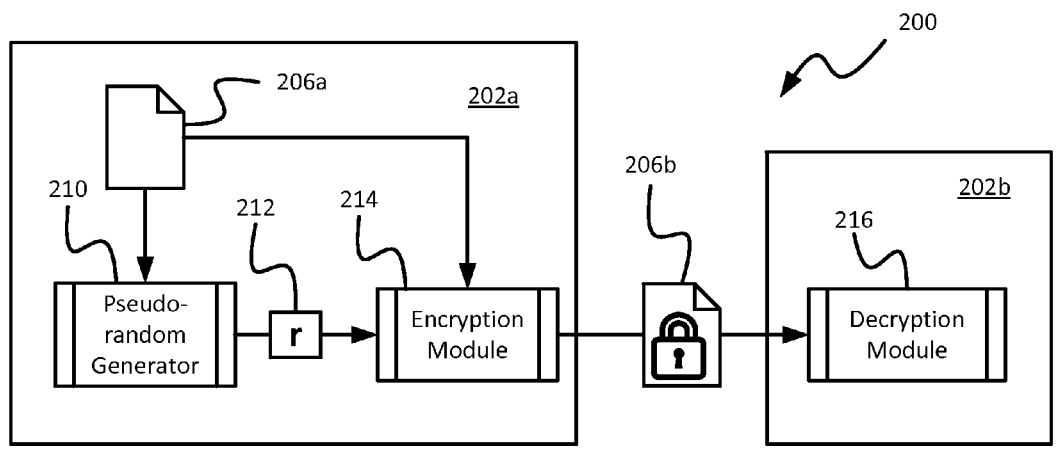
FIG. 2 is a schematic diagram showing aspects of another example cryptography system.

FIG. 2 is a schematic diagram showing aspects of an example cryptography system 200 that implements an encryption scheme. The cryptography system 200 includes terminal modules 202a, 202b. The terminal modules 202a, 202b can each be implemented as computer program modules or other types of modules at one or more terminals. For example, the terminal module 202a can be implemented by the sender terminal 102a of FIG. 1, and the terminal module 202b can be implemented by the recipient terminal 102b of FIG. 1. The terminal modules 202a, 202b can be implemented by additional or different types of hardware systems, software systems, and combinations thereof.

The cryptography system 200 utilizes an encryption scheme to allow secure communication from the terminal module 202a to the terminal module 202b. The encryption scheme may be used for other purposes, for example, to encrypt communications between other terminal modules. In some implementations, the cryptography system 200 uses a public key encryption scheme, a symmetric key encryption scheme, or another type of encryption scheme.

A public-key encryption scheme can, in some cases, be represented as a four-tuple of probabilistic polynomial-time algorithms $\epsilon=(P,K,E,D)$. The parameter generation algorithm P generates encryption parameters based on a specified level of security. In some cases, the parameter generation algorithm P takes as input a security parameter k that indicates the desired security level and generates as output domain parameters par that describe the class of the public key that achieves the desired security level and interoperability. As such, operation of the parameter generation algorithm can be represented as $par \leftarrow P(k)$. In some examples, the output par indicates the bit lengths of the public key and other information (e.g., parameters of an elliptic curve for ECC-based schemes).

The key generation algorithm K generates a key pair based on domain parameters. In some cases, the key generation algorithm K takes as input domain parameters par and generates as output a key pair (sk,pk) that includes a secret key sk and a public key pk. As such, operation of the key generation algorithm can be represented as (sk,pk)←K(par). The key generation algorithm can be deterministic or probabilistic. Additional or different types of key generation algorithms can be used for different types of encryption schemes.

The encryption algorithm E generates an encrypted message. In some cases, the encryption algorithm E takes as input a plaintext message m in $\{0,1\}^*$, a random value r in $\{0,1\}^{\rho(k)}$, and a public key pk. Here, $\{0,1\}^*$ denotes the set of arbitrary length bitstrings, and $\{0,1\}^{\rho(k)}$ denotes the set of bitstrings of length $\rho(k)$, where $\rho(\ )$ is a function specified by the encryption algorithm. In some cases, the encryption algorithm E generates as output a ciphertext message c in $\{0,1\}^*$. As such, operation of the encryption algorithm can be represented as c←E(pk,m; r). The encryption algorithm can be deterministic (provided a value for the randomizer r). Additional or different types of encryption algorithms can be used for different types of encryption schemes.

The decryption algorithm D decrypts an encrypted message. In some cases, the decryption algorithm D takes as input a ciphertext message c in $\{0,1\}^*$ and a secret value sk and generates as output a plaintext message m in $\{0,1\}^*$. As such, operation of the decryption algorithm can be represented as m←D (sk, c). The decryption algorithm can be deterministic. Additional or different types of decryption algorithms can be used for different types of encryption schemes.

The encryption scheme $\epsilon$ can be self-consistent. For example, with reference to the notation introduced above, the scheme $\epsilon$=(P,K,E,D) can be self-consistent in that, for all k and r$\in\{0,1\}^{\rho(k)}$ and all m$\in\{0,1\}^*$, if par←P(k), (sk,pk)←K (par), c←E(pk,m; r), and m'←D(sk,c), then m=m' will be true. The scheme can be implemented in a manner that is secure against certain types of chosen ciphertext attacks (e.g., IND-CCA secure).

In some implementations, the encryption algorithm E is stateful. When a stateful encryption algorithm E' is used, the public-key encryption scheme can be represented as $\epsilon$'=(P,K,E',D), without altering the algorithms P, K, and D. In some cases, the stateful encryption algorithm E' takes as input a plaintext message m in $\{0,1\}^*$, a state value s$\in\{0,1\}^{l(k)}$, and a public key pk and generates as output a ciphertext message c in $\{0,1\}^*$ and a new state s'$\in\{0,1\}^{l(k)}$. The function l(k) may be specified as a parameter to the scheme $\epsilon$'. Accordingly, operation of the encryption algorithm can be represented as (c,s')←E'(pk,m; s). The encryption algorithm can be deterministic (provided a value for the state s). Additional or different types of stateful encryption algorithms can be used for different types of encryption schemes.

The scheme $\epsilon$' can be self-consistent. For example, with reference to the notation introduced above, the scheme $\epsilon$'=(P, K,E',D) can be self-consistent in that, for all k and s$\in\{0,1\}^{l(k)}$ and all m$\in\{0,1\}^*$, if par←P(k), (sk, pk)←K(par), (c,s')←E (pk,m; s), and m'←D(sk,c), then m=m' will be true. The scheme can be implemented in a manner that is secure against certain types of chosen ciphertext attacks (e.g., IND-CCA secure). In some implementations, the state s represents the state of a pseudorandom generator used by the encryption algorithm E'. The encryptor can keep the state s secret and use the output state s' as the input for the next encryption. The initial state can be chosen uniformly at random from $\{0,1\}^{l(k)}$.

The terminal modules 202*a*, 202*b* communicate with each other, for example, over a data network or another type of communication link. The terminal modules 202*a*, 202*b* can implement the public key encryption schemes represented as $\epsilon$ or $\epsilon$' above, or another type of encryption scheme. In the example shown in FIG. 2, the terminal module 202*a* can access an unencrypted message 206*a*, generate an encrypted message 206*b*, and can send the encrypted message 206*b* to the terminal module 202*b*. The terminal module 202*b* can receive the encrypted message 206*b* from the terminal module 202*a* and recover all or part of the unencrypted message 206*a* by decrypting the encrypted message 206*b*.

The example terminal module 202*a* includes a pseudorandom generator 210, an encryption module 214, and possibly other modules. The terminal module 202*a* can access the unencrypted message 206*a*, for example, from a local memory, over a network, or in another manner. The terminal module 202*a* modifies the state of the pseudorandom generator 210 based on the unencrypted message 206*a*. For example, the terminal module 202*a* can modify the state of the pseudorandom generator 210 by invoking a refresh function of the pseudorandom generator 210. In some cases, the terminal module 202*a* modifies the state of the pseudorandom generator 210 based on a refresh value derived or extracted from the unencrypted message 206*a*. The terminal module 202*a* can obtain a random output value 212 from the pseudorandom generator 210. The random output value 212 obtained by the pseudorandom generator 210 depends on the state of the pseudorandom generator 210. The terminal module 202*a* can obtain the random output value 212 based on the modified state of the pseudorandom generator 210. The terminal module 202*a* can provide the random output value 212 and the unencrypted message 206*a* as inputs to the encryption module 214.

The encryption module 214 can implement an encryption algorithm to generate the encrypted message 206*b* from the unencrypted message 206*a* based on the random output value 212. The encryption module 214 can encrypt the message using an encryption key, such as, for example, a shared secret key, a public key, or another type of encryption key. The terminal module 202*a* can initiate communication of the encrypted message 206*b* to the terminal module 202*b*.

The example terminal module 202*b* includes a decryption module 216 and possibly other modules. The decryption module 216 can access the encrypted message 206*b*. The decryption module 216 implement a decryption algorithm to recover all or part of the unencrypted message 206*a* from the encrypted message 206*b*. The decryption module 216 can decrypt the message using a decryption key, such as, for example, a shared secret key, a private key corresponding to a public encryption key, or another type of decryption key.

Figure 3:
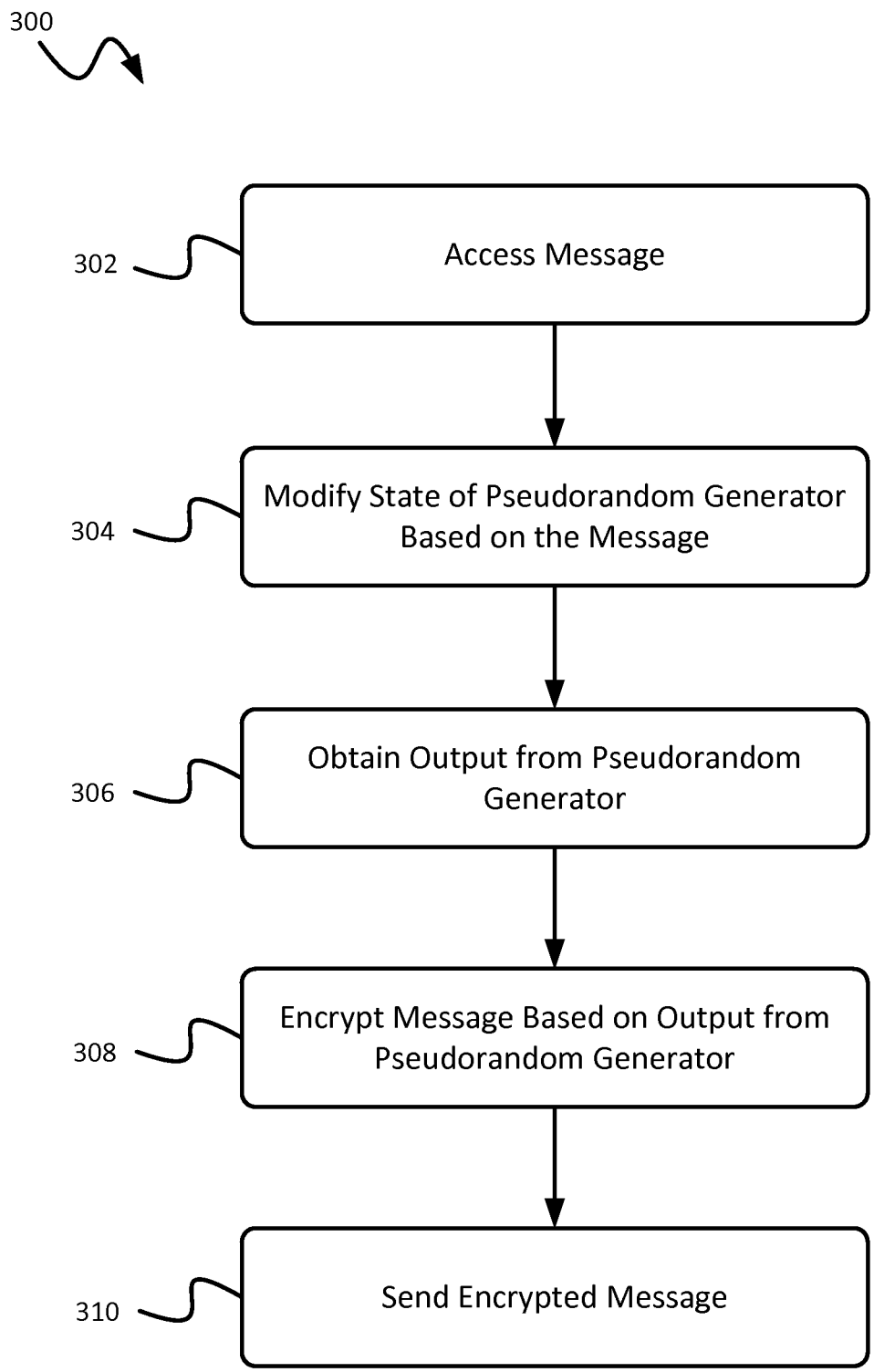
FIG. 3 is a flow chart showing aspects of an example technique for encrypting a message.

FIG. 3 is a flow chart showing an example process 300 for encrypting a message. Some or all of the operations in the example process 300 can be performed by a user terminal, a server, by another type of computing system, or a combination of these. For example, all or part of the process 300 can be executed by the sender terminal 102*a* of FIG. 1 or the terminal module 202*a* of FIG. 2. In some implementations, the process 300 is executed in a secure environment, for example, behind a firewall. The example process 300 can include additional or different operations, and the operations may be executed in the order shown or in a different order. In some implementations, one or more operations in the process 300 can be repeated or executed in an iterative fashion.

At 302, a message is accessed. In some implementations, the message is accessed by a cryptography module of a computing system. Operations of the cryptography module can be executed by a data processor of the computing system. The cryptography module can access the message from a memory of the computing system, from an external source, or in another manner.

In some implementations, the cryptography module that accesses the message can interface with a pseudorandom generator and an encryption module. An example pseudorandom generator R has a security parameter k and a state parameter of length l(k). The example pseudorandom generator R generates an output value r of length 2l(k). A pseudorandom generator can include additional or different parameters. In some implementations, a pseudorandom generator can define an ordered sequence of states, and each state can correspond to a different random output value.

The example pseudorandom generator R has a "next" function and a "refresh" function. When the "next" function is invoked, the pseudorandom generator outputs a random output value based on the current state of the pseudorandom generator and updates the state parameter to a new state. The "next function" can be represented $(r,s') \leftarrow R.next(s)$, where r is the random output value and s is the current state of the pseudorandom generator that is replaced by the new state s'. The "refresh" function accepts a refresh value as an input and changes the state parameter from the current state to different state based on the refresh value. As such, the refreshed state depends on the refresh value. The "refresh" function can be represented $(s') \leftarrow R.refresh(s,x)$, where x is the refresh value and s is the current state of the pseudorandom generator that is changed to the new state s'. A pseudorandom generator can include additional or different functions. For example, additional or different types of operations may be used to obtain the random output value or to refresh the state parameter based on a refresh value.

At 304, the state of the pseudorandom generator is modified based on the message. As such, the state of the pseudorandom generator is changed from a prior state to a new state, and the new state is based at least partially on the information in the message. In some cases, information is extracted from the message and used as a refresh value to refresh the pseudorandom generator. In some cases, all or part of the message can be converted to the appropriate format and size to be used to refresh the state of the pseudorandom generator. The message to be encrypted contains entropy (from an adversary's perspective), and this entropy can harvested by the pseudorandom generator before the message is encrypted. In this way, even if the initial state of the pseudorandom generator does not have full entropy, additional entropy may be harvested from the plaintext before encryption. In some implementations, the entropy harvested from the message together with the entropy of the state of the pseudorandom generator provides the total entropy needed to achieve a specified security level.

As an example, the state parameter of the example pseudorandom generator R can be changed from a prior state s to a refreshed state s' by applying the "refresh" function using information from the message as the refresh value x. In some implementations, this operation can be represented as $(s') \leftarrow R.refresh(s,s\|m)$, where m is the message to be encrypted. In this example representation, the state s is included in the input to ensure that the refresh input is long enough, for example in case m is short, and to explicitly show that s contributes to s' in this representation. In some implementations, all or part of the message m can be used as the only input to the refresh operation of the pseudorandom generator. The refresh value can include all or part of the message m alone or in combination with other information. For example, the message m could potentially be combined with other sources of entropy.

Some examples of standard pseudorandom generators that can be used in some implementations of the process 300 in FIG. 3 include Hash_DRBG, HMAC_DRBG, CTR_DRBG, Dual_EC_DRBG defined in "Special Publication 800-90: Recommendation for Random Number Generation Using Deterministic Bit Generators (Revised)," by E. Barker and J. Kelsey, published by the National Institute of Standards and Technology, dated March 2007. Each of these example pseudorandom generators provides two mechanisms for refreshing the state of the pseudorandom generator: the first mechanism is the "reseed" interface, and the second mechanism is the "additional input" interface. At 304, either of these example mechanisms or another type of mechanism can be used to modify the state of the pseudorandom generator based on information in the message. Other types of standardized or non-standard pseudorandom generators can be used. In some examples, operating system sources of randomness (e.g., /dev/random or /dev/urandom in a Linux system, or others) could be used.

At 306, an output is obtained from the pseudorandom generator. The output is based on the state of the pseudorandom generator that was modified at 304 based on the information in the message. As such, in some implementations the output value from the pseudorandom generator can depend, at least to some extent, on the information in the message. The state of the pseudorandom generator may be updated. For example, the pseudorandom generator may progress to the next state in a sequence of states. In some cases, obtaining the output from the pseudorandom generator causes the state of pseudorandom generator to be updated.

As an example, a random output value can be obtained from the example pseudorandom generator R by applying the "next" function. In some implementations, this operation can be represented as $(r, s'') \leftarrow R.next(s')$, where r is the random output value, s' is the state of the pseudorandom generator prior to obtaining the output, and s'' is the state of the pseudorandom generator after obtaining the output. In this example representation, the random output value and the updated state s'' both depend only on the state s' of the pseudorandom generator when the output is obtained.

At 308, the message is encrypted based on the output from the pseudorandom generator. The message can be encrypted in any suitable manner based on the output of the pseudorandom generator. For example, the message can be encrypted according to a public key encryption scheme, a symmetric key encryption scheme, or another type of encryption scheme. Encrypting the message generates an encrypted message, and possibly additional outputs. Because the random output value is used as an input for one or more operations of the encryption algorithm, the encrypted message may vary based on the random output value.

The random output value can be used in the encryption operation, for example, to hedge against attacks by an adversary. In some implementations, encryption operations incorporate randomness to protect against certain types of attacks, such as, for example, chosen-ciphertext attacks, replay attacks, and possibly others. Some public key encryption schemes generate a shared secret based on the random value and a public key value, and the shared secret is used to encrypt the message. For example, some implementations of the ECIES scheme can generate a shared secret based on a random value. Some public key encryption schemes use randomness to pad the message, for example, by combining the message and the random output value according to a padding function. As a particular example, Optimal Asymmetric Encryption Padding (OAEP) can be used with RSA encryption schemes. The encrypted message can be generated based on the padded message, or in another manner.

Accordingly, a variety of suitable encryption schemes can be used to encrypt the message based on the output from the pseudorandom generator. An example public key encryption scheme that may be use is the Elliptic Curve Integrated Encryption Scheme (ECIES) specified in the Standards for Efficient Cryptography 1 (SEC 1) standard, Version 2.0, dated May 2009 and published by the Standards for Efficient Cryptography Group (SECG). Other examples of public key encryption schemes include those specified in IEEE 1363-2000 ("IEEE Standard Specifications for Public-Key Cryptography," published by the IEEE Standards Association). Other examples of public key encryption schemes include those specified in ISO 18033-2:2006 ("Information technology—Security techniques—Encryption algorithms—Part 2: Asymmetric ciphers," published by the International Organization for Standardization), which utilize random numbers generated by a pseudorandom generator compliant with ISO/IEC 18031:2005 ("Information technology—Security techniques—Random bit generation," published by the International Organization for Standardization).

In some cases, one or more of the operations 302, 304, 306, 308 can be iterated. For example, a large message can be divided into multiple blocks, and each block can be processed individually by the operations 304, 306, 308. In some cases, multiple messages may be combined and processed together.

At 310, the encrypted message is sent. For example, the encrypted message may be sent to a recipient over a public network or another type of public channel. In some implementations, the recipient receives the encrypted message. For example, the encrypted message can be received by a terminal device. In some implementations, the terminal device includes a cryptography module that can invoke a decryption algorithm to decrypt the message. The decryption algorithm can use a private key or another type of secret value to decrypt the received message and recover the plaintext.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, entropy is harvested from a message to be encrypted. The harvested entropy increases the entropy of a pseudorandom generator output. For example, information from the message to be encrypted can be used to refresh the pseudorandom generator.

In some aspects, a computer-implemented encryption method utilizes a pseudorandom generator. A message is accessed. A state parameter of the pseudorandom generator is modified based on information in the message. Modifying the state parameter changes the state parameter from a prior state to a refreshed state based on the information in the message. A random output value is obtained by the pseudorandom generator based on the refreshed state. The message is encrypted based on the random output value.

Implementations of these and other aspects may include one or more of the following features. Encrypting the message includes encrypting the message according to a public key encryption scheme based on a public key value. Encrypting the message includes encrypting the message according to a symmetric key encryption scheme based on a shared secret value. The encrypted message is sent to a recipient. Encrypting the message based on the random output value includes generating a shared secret based on the random output value and a public key value. Encrypting the message based on the random output value includes using the shared secret to encrypt the message. Encrypting the message based on the random output value includes generating a padded message by appending the random output value to the message. Encrypting the message based on the random output value includes encrypting the padded message.

Additionally or alternatively, implementations of these and other aspects may include one or more of the following features. The pseudorandom generator defines an ordered sequence of states that each correspond to a different output value. The refreshed state corresponds to the obtained random output value. When the random output value is obtained, the state parameter is updated to a state after the refreshed state in the ordered sequence. The ordered sequence of states includes the prior state, a subsequent state after the prior state in the sequence, and the refreshed state. Modifying the state parameter of the pseudorandom generator based on the information in the message includes using the information as a refresh value to change the state parameter to the refreshed state. The refreshed state is different from the subsequent state. Modifying the state parameter includes extracting the information from the message and providing the information to the pseudorandom generator. Modifying the state parameter of the pseudorandom generator based on the information in the message prior to obtaining the random output value increases an entropy of the random output value.

In some aspects, a cryptography system includes a terminal. The terminal includes a computer-readable medium storing a message, a pseudorandom generator, and an encryption subsystem. The pseudorandom generator includes a state parameter. The pseudorandom generator is operable to provide a random output value based on a value of the state parameter. The encryption subsystem is operable to change the state parameter from a prior state to a refreshed state based on information in the message. The encryption subsystem is operable to obtain a random output value by the pseudorandom generator based on the refreshed state. The encryption subsystem is operable to encrypt the message based on a random output value.

Implementations of these and other aspects may include one or more of the following features. The terminal further includes a communication interface operable to transmit the encrypted message over a public channel. The terminal is a first terminal. The cryptography system further includes a second terminal operable to receive the encrypted message. The message is encrypted based on a public key value. The second terminal includes a decryption subsystem operable to decrypt the encrypted message based on a private key value corresponding to the public key value.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented encryption method, comprising:
    accessing a message, by a data processing device, wherein accessing the message comprises extracting a portion of the message;
    modifying a state parameter of a pseudorandom generator implemented by the data processing device, wherein modifying the state parameter changes the state parameter from a prior state value of the pseudorandom generator to a refreshed state value of the pseudorandom generator using the extracted portion of the message and the prior state value of the pseudorandom generator;

obtaining, by the data processing device, a random output value by the pseudorandom generator using the refreshed state value;

encrypting, by the data processing device, the message using the random output value, wherein the message includes the extracted portion of the message; and sending the encrypted message to a recipient.

2. The method of claim 1, wherein encrypting the message comprises encrypting the message according to a public key encryption scheme based on a public key value.

3. The method of claim 1, wherein encrypting the message comprises encrypting the message according to a symmetric key encryption scheme based on a shared secret value.

4. The method of claim 1, wherein encrypting the message based on the random output value comprises
generating a shared secret based on the random output value and a public key value; and
using the shared secret to encrypt the message.

5. The method of claim 1, wherein encrypting the message based on the random output value comprises
generating a padded message by combining the random output value and the message according to a padding function; and
encrypting the padded message.

6. The method of claim 1, wherein the pseudorandom generator defines an ordered sequence of state values that each correspond to an output value, the refreshed state value corresponds to the random output value obtained, and the method further includes updating the state parameter to a subsequent state value that follows the refreshed state value in the ordered sequence.

7. The method of claim 1, wherein
the pseudorandom generator defines an ordered sequence of state values including the prior state value, a subsequent state value that follows the prior state value in the ordered sequence, and the refreshed state value; and
modifying the state parameter of the pseudorandom generator using the extracted portion of the message includes using the extracted portion of the message as a refresh value to change the state parameter to the refreshed state value, and the refreshed state value is different from the subsequent state value.

8. The method of claim 1, wherein modifying the state parameter of the pseudorandom generator using the extracted portion of the message increases an entropy of the random output value from an adversary's perspective.

9. A non-transitory computer-readable medium storing instructions that are operable when executed by a data processing device to perform operations for encrypting data, the operations comprising:
accessing by the data processing device, an unencrypted message, wherein accessing the message comprises extracting a portion of the unencrypted message;
modifying, by the data processing device, a state parameter of a pseudorandom generator based on the extracted portion of the unencrypted message, wherein modifying the state parameter changes the state parameter from a prior state value of the pseudorandom generator to a refreshed state value of the pseudorandom generator using the extracted portion of the unencrypted message and the prior state value of the pseudorandom generator;
obtaining, by the data processing device, a random output value by the pseudorandom generator using the refreshed state value;
generating, by the data processing device, an encrypted message using the unencrypted message and the random output value, wherein the encrypted message is generated by encrypting the unencrypted message that includes the extracted portion of the message; and
sending the encrypted message to a recipient.

10. The computer-readable medium of claim 9, wherein generating the encrypted messages comprises encrypting the unencrypted message according to a public key encryption scheme based on a public key value.

11. The computer-readable medium of claim 9, wherein generating the encrypted messages comprises encrypting the unencrypted message according to a symmetric key encryption scheme based on a shared secret value.

12. The computer-readable medium of claim 9, the operations further comprising updating the state parameter to a next state value after the refreshed state value in an ordered sequence defined by the pseudorandom generator.

13. The computer-readable medium of claim 9, wherein modifying the state parameter of the pseudorandom generator using the extracted portion of the unencrypted message comprises using the extracted portion of the unencrypted message as a refresh value to refresh the state parameter.

14. The computer-readable medium of claim 9, wherein the encrypted message is generated based on an encryption algorithm, and the encryption algorithm uses the random output value to randomize an operation of the encryption algorithm.

15. The computer-readable medium of claim 9, wherein modifying the state parameter of the pseudorandom generator using the extracted portion of the unencrypted message increases an entropy of the random output value from an adversary's perspective.

16. A system that includes a terminal, the terminal comprising:
a non-transitory computer-readable medium storing a message;
a pseudorandom generator that includes a state parameter and provides a random output value based on the state parameter;
an encryption system that:
accesses the message using a data processing device, wherein accessing the message comprises extracting a portion of the message;
changes, using the data processing device, the state parameter of the pseudorandom generator from a prior state value of the pseudorandom generator to a refreshed state value of the pseudorandom generator using the extracted portion of the message and the prior state value of the pseudorandom generator;
obtains, using the data processing device, a random output value by the pseudorandom generator using the refreshed state value; and
obtains, using the data processing device, an encrypted message using the message and the random output value, wherein the encrypted message is obtained by encrypting the message that includes the extracted portion of the message; and
a communication interface that transmits the encrypted message over a public channel.

17. The system of claim 16, wherein the terminal comprises a first terminal, the system further comprises a second terminal operable to receive the encrypted message.

18. The system of claim 17, wherein the message is encrypted based on a public key value, and the second terminal includes a decryption system operable to decrypt the encrypted message based on a private key value corresponding to the public key value.

19. The system of claim 16, wherein the pseudorandom generator defines an ordered sequence of state values, and obtaining the random output value updates the state parameter to a next state value in the ordered sequence.

20. The system of claim 16, wherein changing the state parameter of the pseudorandom generator using the extracted portion of the message comprises using the extracted portion of the message as a refresh value to refresh the state parameter.

21. The system of claim 16, wherein changing the state parameter of the pseudorandom generator using the extracted portion of the message increases an entropy of the random output value from an adversary's perspective.

* * * * *